May 12, 1953 V. E. FRIEDEWALD 2,638,215

CARD SELECTING MECHANISM

Filed April 26, 1948 5 Sheets-Sheet 1

Inventor

Vincent E. Friedewald

By Ashley & Ashley

Attorneys

May 12, 1953

V. E. FRIEDEWALD 2,638,215

CARD SELECTING MECHANISM

Filed April 26, 1948

5 Sheets-Sheet 2

Inventor
Vincent E. Friedewald

By Ashley & Ashley

Attorneys

May 12, 1953 V. E. FRIEDEWALD 2,638,215

CARD SELECTING MECHANISM

Filed April 26, 1948 5 Sheets-Sheet 3

Inventor
Vincent E. Friedewald

By Ashley & Ashley
Attorneys

May 12, 1953 V. E. FRIEDEWALD 2,638,215
CARD SELECTING MECHANISM
Filed April 26, 1948
5 Sheets-Sheet 4
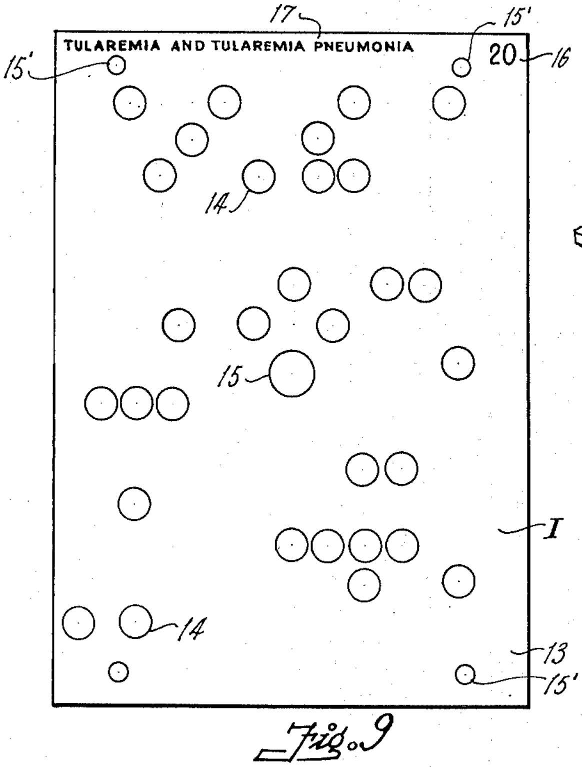
Fig. 9
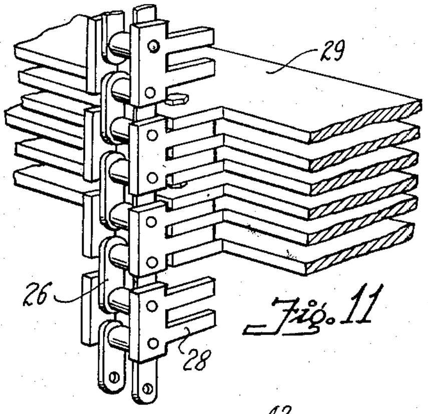
Fig. 11
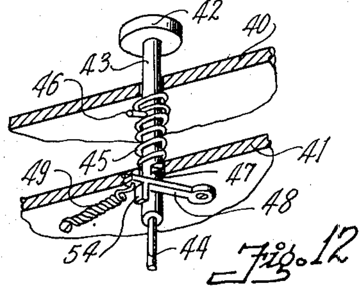
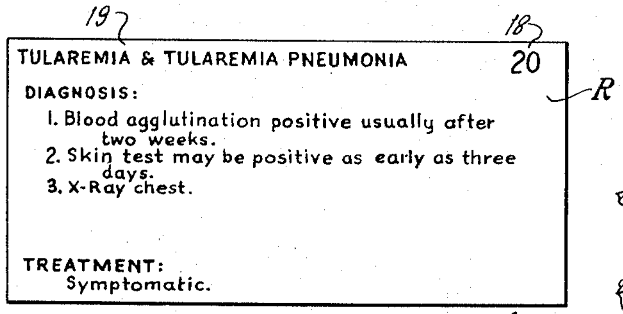
Fig. 10
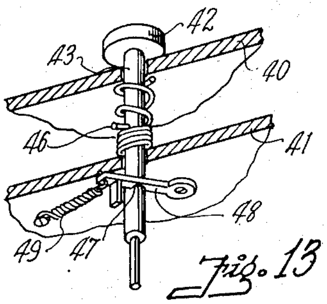
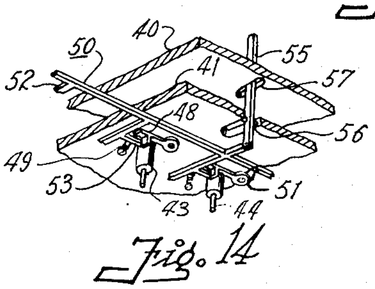
Fig. 14
Inventor
Vincent E. Friedewald
By Ashley & Ashley
Attorneys May 12, 1953 V. E. FRIEDEWALD 2,638,215

CARD SELECTING MECHANISM

Filed April 26, 1948 5 Sheets-Sheet 5

Inventor

Vincent E. Friedewald

By Ashley & Ashley

Attorneys

Patented May 12, 1953 2,638,215

UNITED STATES PATENT OFFICE 2,638,215

CARD SELECTING MECHANISM

Vincent E. Friedewald, Big Spring, Tex.

Application April 26, 1948, Serial No. 23,178

17 Claims. (Cl. 209—110)

This invention relates to new and useful improvements in card selecting mechanisms.

It is one object of the invention to provide an improved and simplified card selecting machine upon which a plurality of criteria may be impressed and which will select from a group of cards only those cards involving the impressed criteria.

Yet another object of the invention is to provide a machine of the character described having a unique and novel drive whereby the same may be actuated from one single source of rotative power.

A still further object of the invention is to provide an improved machine of the character described in which each card represents a certain combination of various criteria, and in which complementary cards are provided one each of the latter cards corresponding or complementing the first named cards.

A particular object of the invention is to provide a card sorting machine containing a plurality of cards, each of which carries certain combinations of criteria different from the other cards, said cards being of a permanent nature and adapted to remain indefinitely in the machine without removal therefrom and to be retained in relative order therein.

Still another object of the invention is to provide an improved machine of the character described above, containing a magazine of complementary cards corresponding to the permanent cards and which are ejected from the machine upon suitable actuation in connection with the permanent cards.

A further object of the invention is to provide a card selecting machine having a keyboard upon which selecting indicia may be impressed, the keyboard operating selecting mechanism into engagement with which a plurality of permanent cards carried by the machine are moved, said cards being carried within the machine and adapted, upon agreement with the impressed criteria, to eject complementary cards from the machine, said complementary cards carrying data corresponding to that represented upon the permanent cards.

A construction designed to carry out the invention will be hereinafter described together with other features of the invention.

Figure 1:
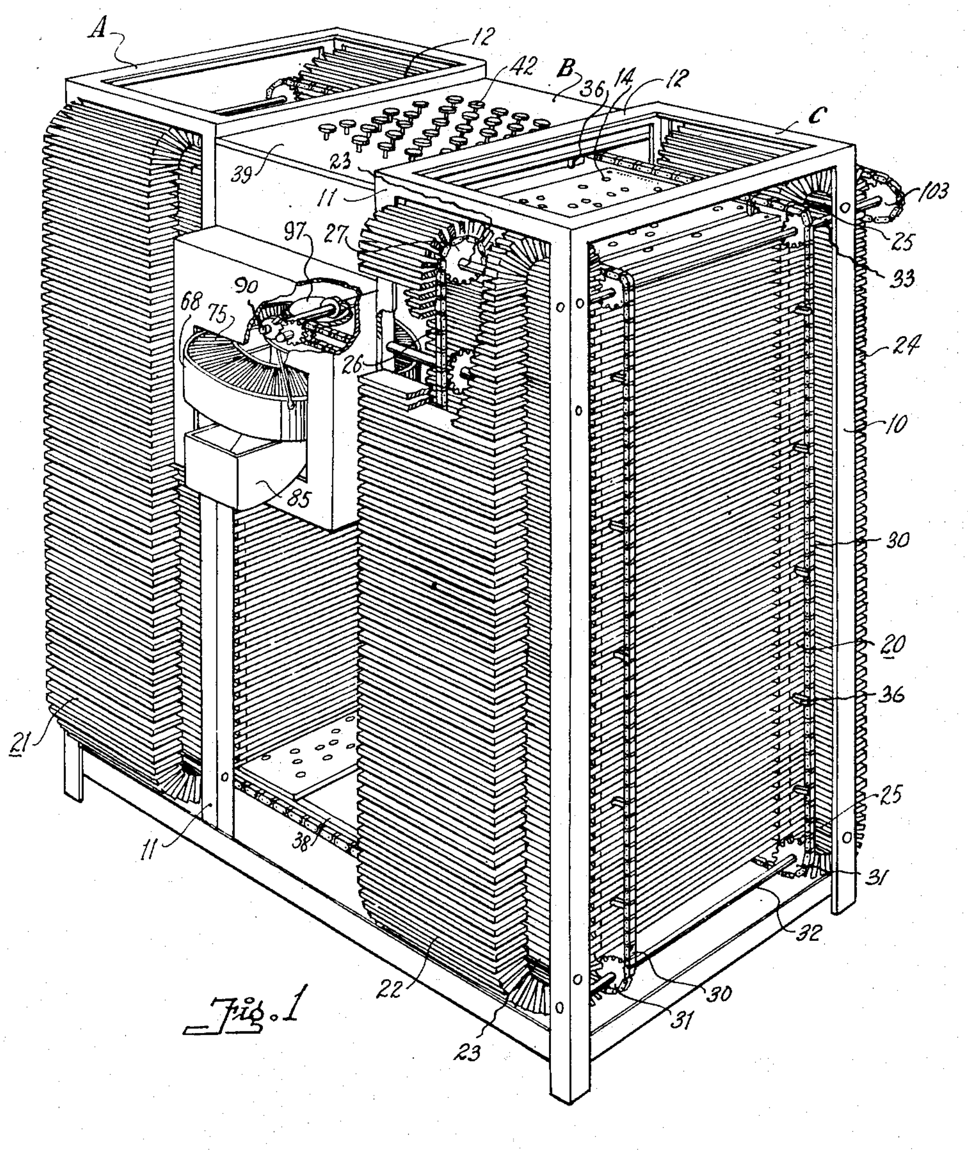
Figure 16:
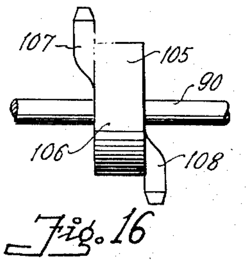
Figures 2, 3, 4:
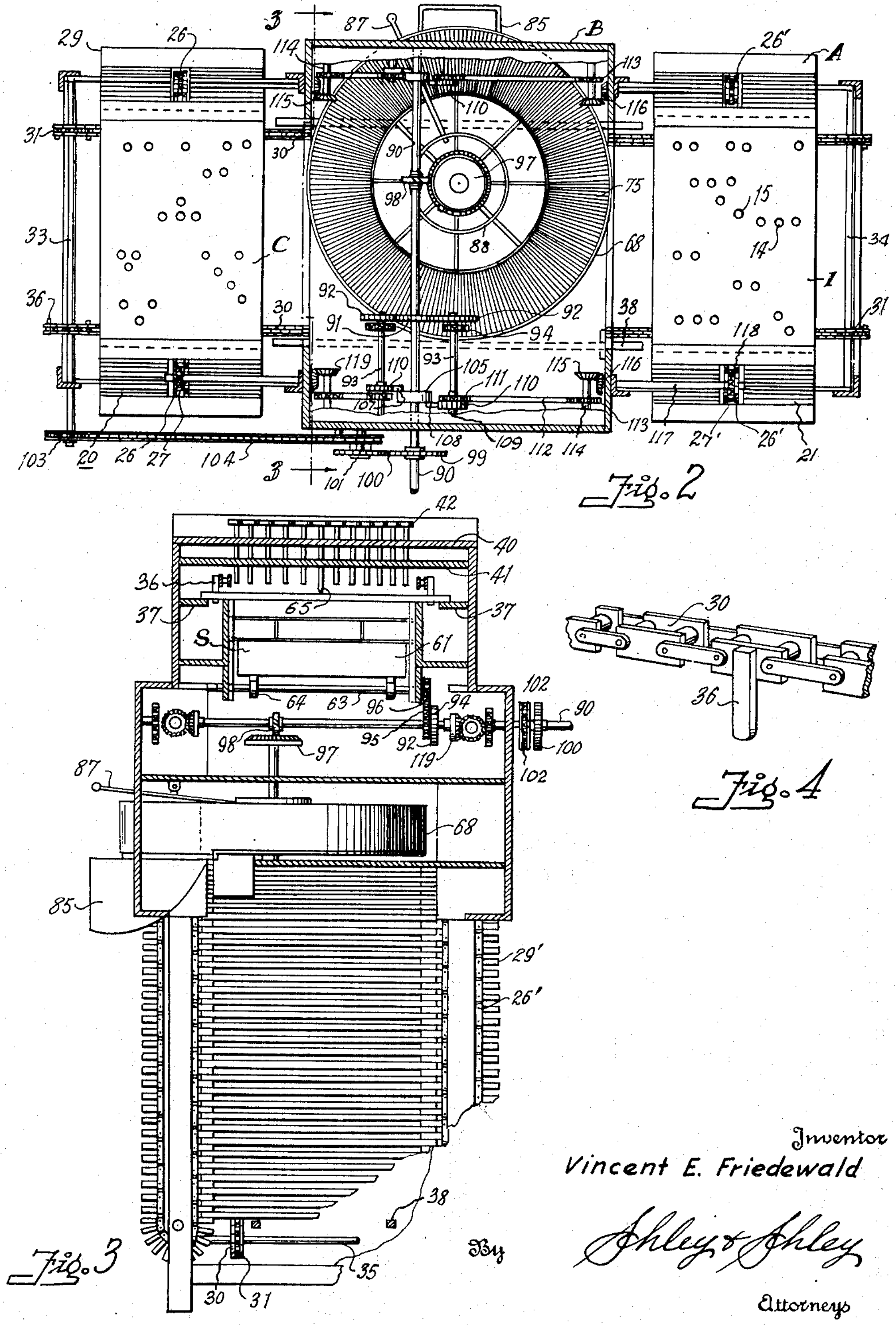
Figures 5, 6, 7:
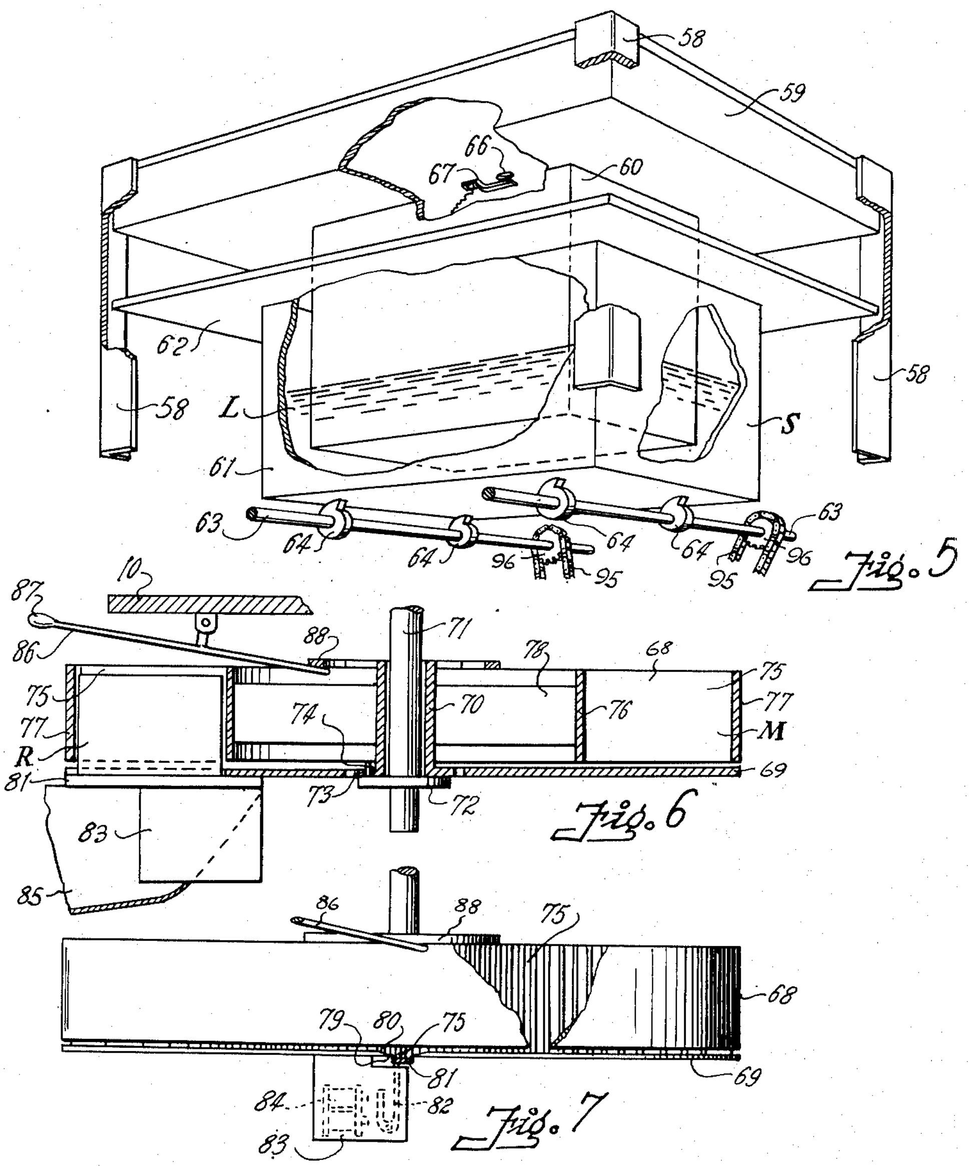
Figure 8:
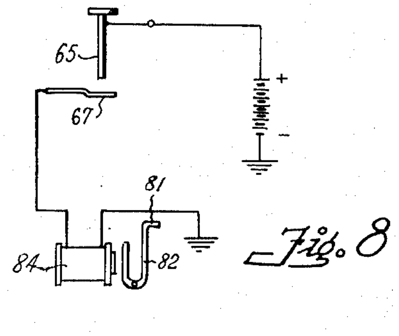
Figure 15:
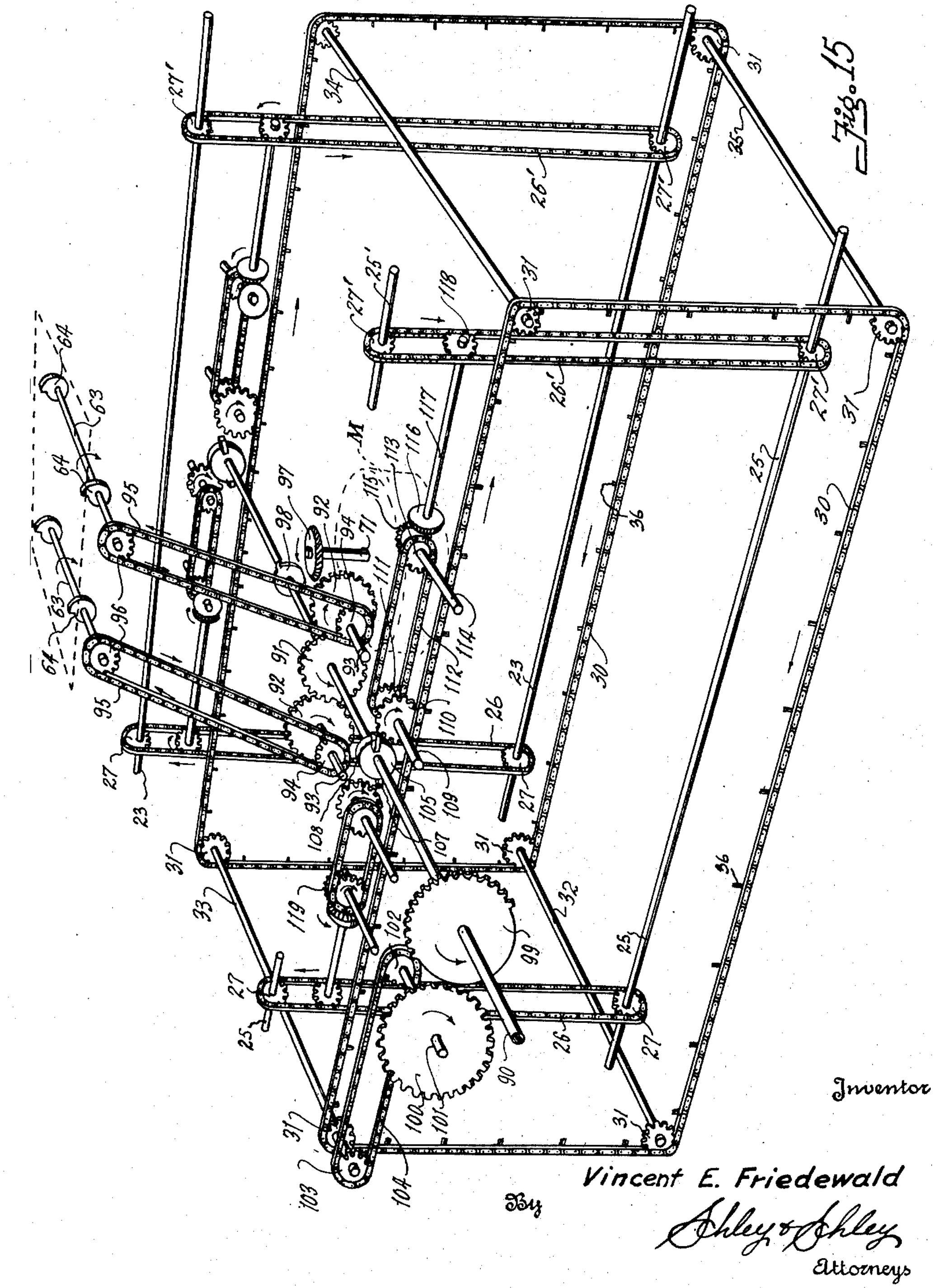

The invention will be more readily understood from a reading of the following specification and by reference to the accompanying drawing, wherein an example of the invention is shown, and wherein:

Fig. 1 is an isometric view, partly broken away to illustrate the structure, of a card selecting machine constructed in accordance with this invention, Fig. 2 is a horizontal, cross-sectional view taken through the body of the machine shown in Fig. 1 a point below the indicia receiving keyboard, Fig. 3 is a vertical sectional view taken upon the line 3—3 of Fig. 2, Fig. 4 is an enlarged isometric, fragmentary view of one of the conveyor chains, illustrating the mounting of the fingers thereon, Fig. 5 is an enlarged isometric view, taken from the underside, of the card raising table and operating means, the view being partially broken away to illustrate the structure, Fig. 6 is an enlarged, vertical, sectional view taken through the complementary card magazine, Fig. 7 is an enlarged side elevation of the card magazine, the view being taken at right angles to Fig. 6 and partially broken away to illustrate the structure, Fig. 8 is a schematic view illustrating the electrical diagram of the machine, Fig. 9 is a view in elevation of one of the permanent cards, Fig. 10 is a view in elevation of one of the complementary cards, Fig. 11 is an enlarged isometric, fragmentary view of the card conveyor shelves, Fig. 12 is an enlarged isometric view, partly broken away, of one of the keyboard keys in raised position, Fig. 13 is a view similar to Fig. 12 and showing the key in a depressed position, Fig. 14 is a view similar to Figs. 12 and 13, and illustrating the key locking and releasing mechanism, Fig. 15 is an isometric, skeletonized view of the driving mechanism for the machine, and Fig. 16 is a view in elevation of one of the driving gears.

In the drawings, the numeral 10 designates an upright, rectangular supporting frame which may be formed of angle iron or any other suitable material. The frame is illustrated as being of relatively open construction, but it is to be understood that suitable housing or enclosing plates and panels may be employed if so desired. The housing may be divided into three upright sections for the purposes of illustration, the left-hand section, as viewed in Fig. 1, being designated by the letter A, the central section by the letter B and the right-hand section by the letter C. The sections are substantially equal in size and are outlined by intermediate supporting posts 11 extending vertically within the confines of the frame 10, and by transverse frame members 12 extending across the upper end of the frame.

This machine is adapted to handle a multiplicity of index cards I, illustrated in Fig. 9, each of which comprises a rectangular, relatively stiff plate 13 carrying a plurality of openings 14 extending therethrough. The positioning of the openings upon the cards corresponds to the particular set or combination of criteria represented by that particular card, and each of the cards carries a different set or combination of such openings. In addition, each card carries a similar opening 15 in its exact center. The cards are numbered as at 16 and also labeled as at 17, and any desirable or suitable number of the cards may be disposed in the machine. In the particular embodiment of the machine illustrated, approximately 300 of the index cards I are employed. However, the machine is not to be limited to this or to any other particular number of index cards.

For each of the index cards I, a somewhat smaller reference card R, as illustrated in Fig. 10, is provided. The reference cards R are small rectangular cards carrying a number 18 corresponding to the number 16 of the index card I to which it corresponds, along with a title 19 identical to the title 17 upon the complementary index card. The reference cards R are disposed in a separate portion of the machine and carry suitable instructions or reference data applicable to the particular set of criteria represented by the openings 14 in the index card I to which that particular reference card relates.

As recited hereinbefore, one purpose of the invention is to provide a machine upon which a particular set of criteria may be impressed with provision being made for the machine then beginning to function automatically and select those index cards I which carry this particular set of criteria. Upon location of these index cards, the machine will automatically eject the corresponding reference cards R.

The handling of the index cards I to enable the machine to sort through the entire set of such index cards available, is accomplished by a double set of vertical conveyors, one of which 20 is disposed in the right-hand section C of the machine, while the other 21 is disposed in the left-hand section A. The right-hand conveyor 20 includes a front vertical flight 22 carried upon suitable horizontal axles 23 journaled in the frame 10 and the upright support 11 and extending across the front of the section C. The conveyor also includes the rear vertical conveyor flight 24 positioned at the rearward side of the section C and carried upon suitable axles 25 journaled in a horizontal position between the frame 10 and rearward support 11. Thus, the conveyor flights 22 and 24 extend vertically at the forward and rearward sides of the section C.

Each of the conveyors 22 and 24 include an endless chain 26 extending around sprockets 27 secured upon the axles 23 and 25. As illustrated in Fig. 11, the chains 26 are provided with a plurality of laterally extending fingers 28 to each of which is secured an elongate rectangular shelf 29. The shelves 29 are relatively narrow and long so as to extend substantially across the forward and rearward sides of the section C, but do not extend any appreciable distance toward the center of said section. The fingers 28 are provided in pairs upon the links of the chain 26, each pair of fingers carrying three shelves and extending therebetween so as to space such shelves apart in a uniform manner and at the same time permit the chain and the shelves to flex sufficiently to pass around the sprocket wheels 27. The shelves of the conveyor flights 22 and 24 are horizontally alined so that one of the index cards I may be disposed upon each shelf so as to have its forward edge supported by one shelf of the forward conveyor flight 22, and its rearward edge supported by the corresponding shelf of the rearward conveyor flight 24. As will appear more fully hereinafter, the inner portions of both conveyor flights move upwardly so that the plurality of index cards I carried by said flights are moved upwardly in a continuous fashion from the bottom of the section C to the top thereof.

The opposite conveyor 21 disposed within the section A is identical in all respects to the conveyor 20 with the exception that the inner portions of the forward and rearward flights move downwardly rather than upwardly. Thus, the conveyor 21 is continually moving the index cards I carried thereby downwardly within the section A from the upper end thereof to the lower end of said section. Since the parts of the two conveyors are substantially identical, the elements of the conveyor 21 have been identified by the same numerals as the elements of the conveyor 20 with a prime being added to the numerals.

A pair of conveyor chains 30 are provided for moving the index cards I from the lower end of the conveyor 21 to the lower end of the conveyor 20, and from the upper end of the latter conveyor back to the upper end of the conveyor 21. Each chain is endless and rides upon sprockets 31 carried upon suitable horizontal shafts or axles extending at right angles to the axles 23 and 25. One of the axles 32 is disposed at the lower end of the section C at the outer side thereof, and journaled in frame 10. The second axle 33 for the section C is in vertical alinement with the axle 32 and journaled in the upper end of the frame 10 at the outer side of the section C. At the opposite end of the machine on the outer face or side of the section A, upper and lower axles 34 and 35 are also provided and are journaled in the upper and lower ends of the frame 10 at that end of the machine. The elongate endless chains 30 thus substantially encircle the entire machine along its longitudinal axis, one of the chains being disposed adjacent the front side of the machine, while the other chain is positioned adjacent the rearward side or face of the machine.

Each of the chains carries a plurality of lugs or fingers 36 which are suitably secured to the sides of the chains and project inwardly toward the interior of the machine and thus toward the conveyors 20 and 21 which they encircle. The fingers 36 are equally spaced upon the chains 30 and the fingers of one chain are in horizontal alinement with the fingers of the other chain. As will appear more fully hereinafter, the spacing between adjacent fingers upon either of the chains is slightly greater than the width of one of the index cards I.

The driving of the conveyors 20 and 21 is intermittent, and is alternated with intermittent driving of the conveyor chains 30. Thus, the conveyor 20 is operated sufficiently to move the next lower index card into the uppermost position wherein it may be engaged by the fingers 36 of the chains 30 which pass over such uppermost position. At the same time, the conveyor 21 is being moved downwardly a distance sufficient to bring the next lower index card into the lowermost position wherein it may be engaged by the fingers 36 projecting upwardly from the bottom flight of the conveyor chains 30, which chains pass under both of the conveyors 20 and 21. The operation or movement of the conveyors 20 and 21 then ceases and the chains 30 are actuated in a counterclockwise direction as viewed in Fig. 1 so that the next pair of fingers 36 upon the front and rear chains 30 engage the edge of the uppermost index card I and move the same from the shelf 29 upon which it is resting into the central section B of the machine. As the card is so moved from the section C to the section B, it passes from support upon the uppermost pair of shelves 29 unto a pair of horizontal tracks 37 which extend along the front and rearward sides of the section B between the sections C and A. At the same time that this movement is taking place, the next ahead pair of fingers 36 is engaging and moving the index card I then resting upon the tracks 37, from the section B into the section A and unto the uppermost pair of shelves 29′ in the latter section.

Simultaneously with this operation, the fingers 36 upon the chains 30 at the lower end of the conveyor 21 engage the lowermost index card in said section and move it unto a pair of horizontal, parallel tracks 38 disposed at the bottom portion of the section B and in substantially horizontal alinement with the upper faces of the lower flights of the chains 30. Also, the next ahead fingers 36 upon the lower flights of the chains move the index card previously resting upon the tracks 38 into the lower end of the section C wherein it is picked up by the next succeeding pair of shelves 29 commencing their upward travel through said section C. In this manner, the multiplicity of index cards I carried by the machine are intermittently moved into the conveyor 20, upwardly by said conveyor, across the upper end of the section B into the upper end of the conveyor 21 in section A, and downwardly through the section A by means of the conveyor 21. At the lower end of the section A, the cards are again moved longitudinally of the machine into the lower end of the conveyor 20 to again begin their upward travel through the section C. Since the operation is intermittent, each of the index cards comes to rest momentarily upon the tracks 37 in the upper portion of the section B in the course of one complete cycle of operation. The relative order of the index cards with respect to one another is not disturbed, and if arranged consecutively within the machine, they will retain such consecutive order or disposition.

If desired, each index card I may be provided with suitable openings 15′ into which the fingers 36 may enter for movement of the cards so as to assure the proper positioning of the latter upon the tracks 37.

The portions of the machine described hereinbefore bring each of the index cards I into position in the upper portion of the section B of the machine for inspection or testing to select those cards having the desired arrangement or arrangements of the openings 14. Operation of the mechanism described therefore permits individual and consecutive testing of each of the plates in the course of one complete cycle.

For the purpose of effecting such a testing procedure, a suitable keyboard 39 is mounted at the upper end of the section B and is connected in a suitable fashion to the intermediate uprights 11 and to the intermediate cross bars 12. The keyboard includes an upper plate 40 disposed horizontally at the uppermost portion of the section B, and a spaced parallel plate 41 disposed therebelow a short distance. A plurality of rows and columns of punch keys 42 are provided in the keyboard section and have their shanks 43 extending downwardly through both the plates 40 and 41. The lower ends of the shanks 43 are reduced in diameter to provide downwardly projecting fingers 44 which project below the lower plate 41. A suitable coiled spring 45 encircles each of the shanks 43 and is confined thereon between the plates 40 and 41. Each of the shanks also carries a transverse pin 46 which projects laterally between the convolutions of the springs 45 intermediate the ends thereof, but nearer the upper ends of said springs. With this structure, downward motion of the shanks and the keys is resisted by the compressing of the springs 45 between the pins 46 and the upper side of the lower plate 41. Also, the portion of the spring above the pin 46 functions as a shock absorber to prevent the direct impact of the pin 46 upon the underside of the plate 40 when the keys are suddenly returned to their upper position.

For retaining the keys in a depressed position, each of the shanks carries a transverse notch 47 in its bottom half, and the plate 41 carries a plurality of spring-pressed latches 48 pivoted thereon. One of the latches is provided for each of the key shanks, said latches being adapted to be swung by their springs 49 into engagement within the notches 47 when the keys are depressed. Thus, upon downward movement of any of the keys, the latch 48 for that key will automatically engage in the notch of the key shank and retain the key in a depressed position. With this structure, certain combination of the keys may be depressed to represent certain combinations of selective criteria, and such keys will be retained in a depressed position until they are released. A simple releasing mechanism is provided in the form of an open rectangular grid 50 having a transverse bar 51 positioned beneath the lower plate 41 and carrying a plurality of longitudinally extending bars 52, one for each row of the keys 42. Each of the bars 52 carries a plurality of laterally directed arms 53, one for each of the latches 48, said arms being adapted to engage depending pins 54 provided upon the outer ends of the said latches. An operating lever 55 is pivotally mounted within an opening 56 in the lower plate 41 and adapted to swing within an elongate slot 57 cut in the upper plate 40 and through which the upper end of the lever projects. By grasping the lever, as illustrated in Fig. 14, and moving it toward the keys, it is obvious that the bars 52 and arms 53 will be moved away from the keys so as to cause each arm to engage the pin 54 of each latch 48 and force said latches from engagement within the slots 47. In this manner, any or all of the keys may be released from a depressed position and allowed to return to their upper position under the impetus of the springs 45 which are compressed between the pins 46 and the upper side of the plate 41.

The keyboard assembly including the plates 40 and 41 and the keys carried thereby is positioned in the uppermost portion of the section B as previously recited. This positioning of the keyboard places it immediately above the parallel tracks 37 over which the index cards slide so that each is momentarily positioned immediately below the fingers 44 carried upon each of the keys 42. For moving the cards I upwardly into engagement with the lower ends of the fingers 44, a card raising structure S, as illustrated in Figs. 3 and 5, is provided. The structure includes four vertical guide channels 58, one disposed at each corner of the structure S, said channels being suitably affixed and supported by the frame 10 and the uprights 11. An upper platform 59 is vertically movable within the channels 58, each corner of the platform being received and guided by one of said channels so that the latter retain the platform in proper alinement in the course of its upward and downward movement. A depending sealed box or float 60 is carried upon the underside of the platform 59 and projects downwardly therefrom, the lower portion of the float being received within a central, rectangular chamber or sump 61 carried by a rectangular plate 62 disposed beneath said platform 59. The corners of the plate 62 also engage within the channels 58 so that the plate is guided in its upward and downward movement by said channels. A body of suitable liquid L, such as water, light oil or glycerine, or the like, is disposed within the sump 61 so as to float the box 60 therein. The buoyancy of the box 60 due to its partial submergence in the body of liquid L, supports said box and the platform 59 a short distance above the bottom of the sump 61 and the plate 62. Thus, when the plate 62 and the sump are moved upwardly or downwardly, the platform 59 is caused to move therewith, but in the event upward movement of the platform is obstructed, the sump and plate may continue to move upwardly resulting merely in further submergence of the float 60 in the body of liquid L and not in any physical damage to the various elements. If desired, suitable springs (not shown) may be positioned between the plates 59 and 62 to function in place of the hydraulic system described and to provide a yieldable raising arrangement. A pair of driving shafts 63 extend horizontally beneath the underside of the sump 61, said shafts extending from the front portion of the middle section B to the rearward portion thereof and being suitably journaled in elements of the frame 10. Each of the shafts 63 carries a pair of cams 64 which engage the underside of the sump 61 and raise and lower the latter as the shafts are rotated. As will appear more fully hereinafter, the shafts 63 are intermittently rotated so that the sump 61 and plate 62 are also intermittently raised and lowered.

As set out hereinabove, when the sump 61 is raised and lowered, the buoyant force exerted by the body of liquid L upon the float 60 causes the platform 59 to be also raised and lowered. Thus, as the platform 59 moves upwardly, it passes between the parallel upper tracks 37, lifting the index card I, which is resting on said tracks, from the tracks and into engagement with the lower ends of the key pins 44.

It is at this precise point that the selection of the index cards takes place. A certain predetermined combination or arrangement of the keys 42 will have been depressed to represent the particular combination or arrangement of criteria for which a card must be found. Since the openings 14 upon each of the cards I correspond in location to the keys 42, any one particular index card will not be able to move to the uppermost position unless it has an opening 14 in the proper position for each of the depressed keys 42. Thus, if a certain one of the keys 42 is depressed, and the particular index plate I which is underlying the keyboard at that moment does not carry the corresponding opening 14, the index card can be moved upwardly by the platform 59 only until the lower end of the key finger 44 of that particular key engages the upper surface of the index card. Further upward movement is prevented so that the float 60 is caused to submerge further within the body of liquid L as the plate 62 continues its normal upward movement. However, if the particular index plate beneath the keyboard carries one of the openings 14 in the proper position for each of the keys 42 which are depressed, the card will be free to move to the uppermost position as the lower ends of the key fingers 44 pass through the openings 14, and the platform 59 thus is permitted to undergo its full upward travel. Dependent upon the particular set of criteria impressed upon the machine by depressing of certain of the keys 42, several of the index cards may carry the necessary arrangement of openings 14 to permit such full upward travel of the platform 59, or only one of said cards I may permit such movement. However, as the machine goes through an entire cycle, each of the index cards is tested in this manner so that those carrying the arrangement of openings corresponding to the impressed data or criteria are selected.

For actuating the balance of the machine when a proper index card or cards are so selected from the entire set, the key 65 in the exact center of the keyboard carries a depending finger of greater length than the remaining fingers 44 of the other keys. This central key is not adapted to be depressed and released, but remains in the same position at all times with its lower end extending below the lower ends of the remaining keys. As previously recited, each of the index cards I is provided with an opening 15 in its exact center, and it is obvious that such openings 15, will be in vertical alinement with the center key 65 as each of the cards is brought into vertical registry with the keyboard. A central opening 66 is also provided in the upper portion of the platform 59, and a spring electrical contact 67 is disposed upon the underside of the top of the platform 59 immediately beneath said opening 66. As any one of the index cards is moved upwardly into engagement with the key fingers or pins 44, the central key 66 is moved through the central opening 15 of the card and also through the central opening 66 of the platform 59. However, this central key 65 does not come into contact or engagement with the spring contact 67 unless the card carries openings 14 corresponding to the depressed keys 42 so as to permit the card to move to the uppermost position. If a key is depressed which is not matched by a corresponding opening 14 in the index card being tested and the card therefore does not move into the uppermost position, the key 65 will not come into engagement with the contact 67. However, as the proper index card or cards are tested, that is, those cards having openings in the same arrangement as the keys which have been depressed, the platform 59 is permitted to move the card to the uppermost position and the key 65 passes the opening 66 into engagement with the electrical contact 67.

The engaging of the contact 67 by the key 65 closes an electrical circuit which actuates a magazine structure M positioned within the central section B below the keyboard section and the horizontal tracks 37. The magazine section M carries the reference cards R which correspond to the index cards I, and the actuation of this magazine section M occurring when the proper index card or cards are raised into engagement with the key pins 44, causes the reference cards corresponding to those particular index cards to be ejected from the magazine for the use of the operator.

The magazine section includes a flat cylindrical magazine or drum 68 having an open top and bottom. A fixed plate 69 is positioned beneath the open bottom and spaced a small distance therefrom. The magazine carries an axial spool or sleeve 70 which has a sliding fit upon a vertical shaft 71 suitably journaled into the framework 10 of the machine. The shaft 71 carries a radial flange 72 upon which the lower end of the sleeve 70 of the magazine rests, the flange being provided with an upstanding pin 73 adapted to engage within an opening 74 cut in the rim of said spool. With this structure, rotation of the shaft 71 causes rotation of the magazine 68 because of the engagement of the pin 73 and the opening 74. However, the magazine is free to be lifted from engagement with the pin 73 and rotated at will, but must always be returned to the same radial position to permit re-entry of the pin 73 into the opening 74.

The outer portion of the magazine is divided into a multiplicity of vertical, radially extending pockets 75, each of which receives one of the reference cards R. Obviously, the number of the pocket 75 corresponds to the number of the reference cards R which are employed in the machine. The inward walls of the pockets 75 are defined by an annular partition 76 positioned concentrically within the magazine and inwardly spaced from the marginal wall 77 thereof. A plurality of radial webs or braces 78 extend between the sleeve 70 and the partition 77 to add rigidity to the magazine structure.

To permit the ejection of the proper reference cards, the immovable, circular plate 69 is provided with a radial slot 79 having tapered edges 80. The slot 79 is directed from the center of the magazine structure toward the front of the machine and is closed by an elongate gate 81 which underlies the slot and is adapted to be moved from therebeneath to permit certain of the reference cards to drop downwardly through said slot. The gate 81 is carried upon a spring-pressed armature 82 pivoted within a housing 83 which depends from the underside of the plate 69 and carries a suitable magnetic coil or solenoid 84. The rotation of the magazine M is synchronized with the movement of the index cards I through the testing portion of the machine so that when any particular index card is being tested, the corresponding reference card is overlying the slot 79. Thus, when the key 65 engages the contact 67 and closes the electric circuit, the solenoid 84 functions to draw the armature 82 and the gate 81 to one side and permit the proper reference card to drop through the slot 79. A suitable chute or receptacle 85 is positioned beneath the slot for catching the reference cards and placing them in a position wherein it is readily available to the operator of the machine.

By employing the separate index cards I and reference cards R, the loss, damage or replacement of the index cards is avoided, and there is no possibility of their being arranged or replaced in the machine in the wrong order. Also, wear, soiling, or damage due to handling is avoided.

After the operator has put the reference cards R to the desired use, they are returned to the proper pocket 75 in the magazine section M. To facilitate this operation, each of the pockets may carry an identifying number (not shown) corresponding to the number 18 appearing upon the reference card R. Provision is also made for lifting the magazine drum 68 from its engagement with the pin 73 so as to permit the free revolution of the drum in the course of returning the reference cards to their proper pocket. This means includes a lever 86 suitably pivoted to the frame 10 above the drum 68 and having a handle 87 upon its outer end. The inner end of the lever 86 engages beneath an annular ring 88 carried by the magazine drum at the upper end of the sleeve 70 and spaced radially therefrom. Upon depression of the handle 87, the ring 88 is lifted so as to cause the magazine drum 68 to raise from engagement with the pin 73 and be free for rotation as the operator desired. Of course, upon release of the lever 86, the drum returns to engagement with the pin 73, and rotation of the drum will bring the opening 74 into alinement with and engagement by said pin so as to return the drum to its pre-set rotative alinement with the balance of the machine element.

In Fig. 15 is illustrated the driving arrangement for the various portions of this machine, such arrangement being so designed as to permit operation from only a single source of rotative motion such as an electric motor. Of course, it is to be understood that separate motors may be employed if designed and actuated by suitable microswitches or other similar devices (not shown).

The driving arrangement includes a main driving shaft 90 extending transversely of the machine near the upper end of the middle section B above the magazine section M and below the camshaft 63. The shaft 90 may be connected for driving to an electric motor (not shown) or any other suitable source of motive power, and will in most instances be connected to such source through any suitable type of speed reducing mechanism. Near the central portion of the machine, the shaft 90 carries a suitable gear wheel 91, and a pair of similar gear wheels 92 are disposed, one on each side of the gear 91 so as to mesh therewith. The gears 92 are carried upon suitable horizontal shafts 93 journaled within the frame 10 so that rotation of the shaft 90 in a counterclockwise direction, as indicated in Fig. 15, results in rotation of both of the gears 92 and both of the shafts 93 in a clockwise direction. Each of the shafts 93 carries a smaller sprocket 94 which receives endless chains 95 extending upwardly and around sprockets 96 disposed upon and connected to the camshafts 63. By this driving arrangement, the shafts 63 and therefore the cams 64 are continuously driven and the sump 61 is continuously raised and lowered as the high and low points, respectively, of said cams engage the underside of said sump in the course of the rotation of the cams.

For rotating the magazine structure M, a bevelled gear 97 having helical teeth, is mounted upon the upper end of the shaft 71 and adapted to be engaged by a single tooth gear 98 secured upon the shaft 90 in the vertical plane of the shaft 70. Thus, since the gear 98 carries only one helical tooth, the gear 97 is advanced only one tooth for each revolution of the shaft 90. Since the drive or the conveyor chain 30 is arranged to advance said chains sufficiently during each revolution of the shaft 90 to move each of the index cards into the next position, it is obvious that the gear 97 must carry a number of teeth equal to the number of index cards, and therefore the number of reference cards, employed in the machine. In this manner, as each successive index card is moved into the testing position, the magazine structure M is moved to the next succeeding pocket to place the next successive reference card in vertical alinement with the slot 79.

The drive for the conveyor chains 30 includes a gear wheel 99 secured upon the shaft 90 at the rearward side of the machine and having gear teeth around only one-half of its periphery. These gear teeth are adapted to engage the gear teeth of a second gear 100 carried upon a shaft 101 suitably journaled upon the frame 10 at one side of the shaft 90 and extending parallel thereto. The shaft 101 carries a small sprocket 102, and a similar sprocket 103 is secured upon the rearward end of the shaft 33 which is extended for this purpose. An endless chain 104 encircles the sprockets 102 and 103 so as to transmit the driving power from the shaft 101 to the shaft 34. Obviously, rotation of the shaft 34 and its sprocket 31 result in the desired movement of the chains 30 in a clockwise direction around the machine as viewed from the rearward side in Fig. 15. The angular placing of the toothed portion of the gear 99 is such as to cause movement of the chains 30 during the period measured by the downward travel of the sump 61 as actuated by the cams 64. This downward travel represents about one-half of the time of one revolution of the shaft 90, while the upward travel represents the other half of the time of one revolution of said shaft. By providing teeth around substantially one-half of the gear 99, the chains 30 are thus caused to move as desired during one-half of each revolution of the shaft 90, and are at rest for the other half of each revolution. The arrangement and sizes of the gears 100 and the sprockets 102 and 103 are arranged so as to give or provide the desired length of travel for the chains 30 during each period of movement. As previously recited, this length of movement is sufficient to move one of the index cards from the right-hand section C into the center section B and into vertical alinement with the keyboard structure 39.

For operating the vertical conveyors 20 and 21, the shaft 90 carries a double-tooth gear 105 affixed thereon adjacent the rearward wall of the machine. The gear 105 is shown in detail in Fig. 16, and comprises a cylindrical body 106 having a single tooth 107 affixed to one face of the body 106 and projecting beyond the margin thereof. A similar tooth 108 is affixed to the opposite face of the body 106 and projects diametrically opposite the tooth 107. Thus, as the gear 105 is rotated the teeth 107 and 108 travel in parallel, but spaced, paths. A countershaft 109 is suitably journaled within the framework 10 and extends parallel to the shaft 90 at one side of said shaft. As viewed in Fig. 15, the shaft 109 is to the right of the shaft 90 toward the section A of the machine and the vertical conveyor 21. A gear wheel 110 is secured upon the shaft 109 and is disposed in the path of travel of the tooth 108 so that rotation of the shaft 90 causes advancement of the shaft 109 in a clockwise direction the space of one tooth for each revolution of said shaft 90. A sprocket wheel 111 is also secured upon the shaft 109 and an endless sprocket chain 112 passes around the sprocket 111 and 113 mounted upon a second countershaft 114 disposed parallel to the shaft 109 and further to the right thereof. A miter gear 115 is secured upon the shaft 114 and engages a second miter gear 116 provided upon the inner end of a shaft 117 which extends longitudinally of the machine parallel to and below the upper shaft 25′ at the upper end of the rearward conveyor flight 24′. The outer end of the shaft 117 extends between the parallel runs of the chain 26′ and has secured thereto a sprocket wheel 118 which engages both runs of the chain 26′ to drive the same. The upper and lower sprocket 27′ of the conveyor flight 24′ of course idle upon the axles 25 and 25′ and rotation of the latter is not necessary. With this structure, the chain 26′ is advanced only a small distance with each revolution of the shaft 90, and the diameters of the various sprockets and gears is selected to make this small advance equal to the distance between adjacent shelves 29′. Therefore, for each revolution of the shaft 90, the next succeeding index card I is moved by the chain 26′ to the lowermost position within the vertical conveyor flight 21.

A similar arrangement is provided for driving the rearward flight of the vertical conveyor 20 within the machine section C. This second driving arrangement, designated generally by the numeral 119 is identical in all respects to the driving arrangement just recited, but is operated by the opposite tooth 107 of the gear wheel 105. Being disposed to the left of the shaft 90 as viewed in Fig. 15, the driving connection 119 is necessarily operated in the opposite to that of the first described driving arrangement since it is actuated by the gear tooth 107 moving downwardly rather by the gear tooth 108 moving upwardly as was true in the first instance. Therefore, the conveyor chain 26 is actuated to move the shelf 29 upwardly rather than downwardly, and upon each revolution of the shaft 90, the next succeeding index card is raised to the uppermost position within the conveyor 20.

For driving the opposite halves of the conveyors 20 and 21, this entire double driving structure is duplicated at the forward part of the machine and functions to drive the forward flights of the two conveyors in the same manner as hereinbefore set forth. The same intermittent operation is employed.

The driving structure and arrangement described permits continuous revolution of the shaft 90 and continuous revolution of the camshafts 63 so that the sump 61, and therefore the entire raising and lowering structure S is continuously being moved upwardly and downwardly within the guide channels 58. During one-half of each revolution of the shaft 90, the conveyor chains 30 are advanced the distance proper to move the next successive index card into the keyboard section of the machine, and during the opposite half of each revolution of the shaft 90 the various chains 26 and 26′ are actuated to move each stack of index cards vertically within the machine sections A and C. Thus, the vertical and horizontal movement of the index cards through the machine is segregated whereby each may progress independently of and without interference by the other.

Once during each revolution of a shaft 90, the magazine section M is also advanced to bring the next succeeding pocket and therefore the next succeeding reference card into vertical alinement with the slot 79 so that said magazine section continually keeps pace with the advancement of the index cards through the machine and into the keyboard section.

It is obvious that a machine of this nature has many uses in the selective handling and inspection of various bodies of assembled data. One particular and unusual application is illustrated by the index and reference cards shown in Figs. 9 and 10 of the drawings, and that is the diagnosis of various diseases and other physical ailments.

There are approximately 300 known diseases which occur in the human species, and it is well known that each of these diseases exhibits more or less characteristic groups or combinations of symptoms. Each data as blood pressure and pulse, temperature, the various blood and skin tests, and the many other implements of medical diagonsis give indications as to the disease or ailment from which a person may be suffering. By assembling all of these various exhibited symptoms of a patient, the medical practitioner has a particular and peculiar arrangement or combination of symptoms which is characteristic and indicative of a certain ailment or ailments. It would only seem necessary from this point to select that ailment represented by the various exhibited symptoms but in practice, this step presents considerable difficulties. It is seldom possible for the practitioner to keep at his finger tips the exact and detailed symptoms of each disease especially the less frequently encountered varieties. Of course, this material may be found in the various reference books, but the time required to check through the characteristics of each disease by referring to such books prohibits the following of such a practice. However, the present invention represents an admirable means of carrying out this highly desirable function. Each of the index cards I may be punched with the openings 14 so arranged as to correspond to the various observable symptoms or signs which a patient may exhibit. Thus, one opening may represent a high white blood cell count, or one opening may represent a low red blood cell count, and so forth. Each index card is labelled with the disease or ailment the symptoms of which are represented by the openings 14 provided on such card. At the same time, the corresponding reference card for the index card may list additional specific tests for that particular disease as well as the treatment for the disease and any other desirable or necessary notations. A medical practitioner may then impress a patient's symptoms and signs upon the machine by depressing those of the keys 42 which correspond to those certain symptoms and signs. Then, as the entire set of index cards, which in this instance would number approximately 300, is fed through the keyboard section of the machine in the course of its operation, all of the known diseases would be quickly compared with the patient's exhibited symptoms and signs and the reference cards R for each disease or ailment which fits those symptoms and signs will be dropped into the chute 85. The entire operating cycle of the machine in working through this number of index cards requires only a few moments, and the medical practitioner is thus provided very quickly with possibly only one but probably several diseases or ailments, the particular and specific symptoms and signs of which correspond exactly to those exhibited by his patient. With this quick and extreme narrowing of the field of search, the skilled practitioner may quickly consummate the diagnosis and narrow the possibilities to only one or two diseases. Obviously, since the practitioner may be concerned at this point only with the very few diseases indicated, he may resort to his own medical knowledge and to the reference books for further elimination of possibilities and the determination of the exact disease or ailment from which the patient is suffering.

Upon the completion of this operation, the reference cards R which have been removed from the machine are returned to the magazine section M by the operation of the lever 86 and the revolution of the drum 68 to permit insertion of said cards in their proper pockets. Operation of the lever 55 unlocks the keyboard and returns all of the keys 42 to their upper position so that the machine is quickly placed in condition for subsequent operations.

It is manifest that many other uses for the machine exist. Each of the index cards I may carry any desired type of data in the form of the openings 14, such as the characteristics of any particular person or family, or of a business or a community. The entire body of the index card then will represent the details of a sizeable group of people or families, or a section of the country, or an entire industry. By impressing the desired data upon the keyboard by depressing the keys 42 in corelation to certain selected criteria of those persons, or businesses, or communities, and placing the machine in operation, it will automatically select those persons or businesses having the desired combinations or sets of characteristic factors. It is obvious that the uses of the machine are manifold.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A card selecting mechanism including, a supporting frame, a card conveyor disposed at one end of the frame, a second card conveyor disposed at the opposite end of the frame, a plurality of index cards carried by the two conveyors, a third conveyor extending between the ends of the first and second conveyors for conveying index cards therebetween, an index card testing mechanism disposed between the first and second conveyors for testing each index card as it passes from one of said conveyors to the other, a magazine carried by the supporting frame and adapted to contain a plurality of reference cards each corresponding to one of the index cards, means controlled by the index card testing mechanism for removing reference cards from the magazine, and means for effecting relative movement between the magaznie and the reference card removing means in synchronization with the movement of the index cards whereby the reference cards in the magazine are brought into position relative to the card removing means for removal from the magazine in synchronization with the movements of the index cards.

2. A card selecting mechanism including, a supporting frame, a card conveyor disposed at one end of the frame, a second card conveyor disposed at the opposite end of the frame, a plurality of index cards carried by the two conveyors, a third conveyor extending between the ends of the first and second conveyors for conveying index cards therebetween, a card-shifting structure between the first and second conveyors, a card-testing mechanism into engagement with which the cards are shifted, an electrical contact carried by the card-shifting structure, a complementary electrical contact associated with the testing mechanism and adapted to close an electrical circuit through the first-named contact, a solenoid in said circuit, a drum magazine carried by the supporting frame and adapted to contain a plurality of reference cards each corresponding to one of the index cards, a gate operated by the solenoid for permitting selected reference cards to drop from the magazine, and means for revolving the magazine over the gate in accordance with the moveemnt of the third conveyor.

3. A card selecting mechanism including, a supporting frame, an endless card conveyor at one end of the frame, a second endless card conveyor at the opposite end of the frame, a multiplicity of cards carried by the two card conveyors, means for driving the two conveyors in opposite directions, a third endless card conveyor extending adjacent to the perimeter of the frame and contiguous to both ends of both the first and second card conveyors for receiving and delivering cards therefrom and thereto, means for driving the three conveyors, a card-shifting structure between the first and second conveyors, a plurality of individually depressible keys into engagement with which the cards are shifted, an electrical contact carried by the card-shifting structure, a complementary electrical contact associated with the keys and adapted to close the electrical circuit through the first-named contact, a solenoid in said circuit, driving means for reciprocating the card-shifting structure, a magazine carried by the supporting frame and adapted to contain a plurality of reference cards carried in the mechanism, a gate operated by the solenoid for releasing reference cards from the magazine in accordance with the closure of the electrical circuit, and means for revolving the magazine in accordance with the movement of the index cards through the mechanism.

4. A card selecting mechanism including, a supporting frame, an upwardly moving card conveyor at one end of the frame, a downwardly moving card conveyor at the opposite end of the frame, a plurality of cards carried by the card conveyors, horizontal conveyors extending between the upper and lower ends of the card conveyors, a card testing mechanism disposed between the card conveyors for testing each card as it passes from one card conveyor to the other, a magazine carried by the supporting frame having a plurality of compartments adapted to receive a plurality of reference cards each corresponding to one of the index cards, means for releasing the reference cards from the magazine in accordance with the operation of the card testing mechanism, and means for effecting relative movement between the magazine and the reference card removing means in synchronization with the movements of the index cards whereby the reference cards in the magazine are brought into position relative to the card removing means for removal from the magazine in synchronization with the movements of the index cards.

5. A card selecting mechanism including, a supporting frame, a card conveyor carried by the frame having a multiplicity of card carrying elements, a multiplicity of cards carried by the card conveyor, means for driving the card conveyor to carry the cards from one portion of the mechanism to a second portion thereof, a second card conveyor carried by the frame spaced from the first-named card conveyor and having a multiplicity of card carrying elements, a multiplicity of cards carried by the second card conveyor, means for driving the second conveyor in a direction substantially opposite to the direction of movement of the first conveyor, a pair of conveyors extending between the ends of the aforementioned card conveyors, means for driving the latter conveyors in opposite directions, a card testing mechanism disposed between the card conveyors for testing each card as it passes from one card conveyor to the other, a magazine carried by the supporting frame and adapted to contain a plurality of reference cards each of said cards corresponding to one of the first-named cards, a gate disposed beneath the magazine for releasing certain of the reference cards therefrom in accordance with the operation of the card testing mechanism, means for bringing the reference cards and the releasing gate into reference card releasing relationship, and means for maintaining the bringing of the reference cards and the releasing gate into such relationships in synchronization with the movements of the index cards.

6. A card selecting mechanism including, a supporting frame, an endless card conveyor at one end of the frame, a second endless card conveyor at the opposite end of the frame, a multipilicity of cards carried by the two card conveyors, means for driving the two conveyors in opposite direction, a third endless card conveyor extending adjacent to the perimeter of the frame and contiguous to both ends of both the first and second card conveyors for receiving and delivering cards therefrom and thereto, means for driving the first and second conveyors together in intermittent fashion, means for intermittently driving the third conveyor alternately with the intermittent driving of the first and second conveyors, a card testing mechanism disposed between the first and second card conveyors for testing each card as it passes from one of the latter conveyors to the other, a magazine carried by the supporting frame and adapted to contain a plurality of reference cards each of said cards corresponding to one of the first-named cards, a gate disposed beneath the magazine for releasing certain of the reference cards therefrom in accordance with the operation of the card testing mechanism, means for bringing the reference cards and the releasing gate into reference card releasing relationship, and means for maintaining the bringing of the reference cards and the releasing gate into such relationships in synchronization with the movements of the index cards.

7. A card selecting mechanism including, a supporting frame, an endless card conveyor at one end of the frame, a second endless card conveyor at the opposite end of the frame, a multiplicity of cards carried by the two card conveyors, means for driving the two conveyors in opposite directions, a third endless card conveyor extending adjacent to the perimeter of the frame and contiguous to both ends of both the first and second card conveyors for receiving and delivering cards therefrom and thereto, a driving shaft carried by the supporting frame, driving connections between the driving shaft and the first and second conveyors, one element in the said driving connections being a driving gear having teeth on only a portion of its periphery whereby the first and secondary conveyors are driven intermittently, a driving connection between the third conveyor and the driving shaft, one element in the latter connection being a gear wheel having teeth on only a portion of its periphery whereby the third conveyor is intermittently driven, the teeth of the last-named gear wheel being rotatively displaced from the teeth of the first-named gear wheel so that the driving of the third conveyor is alternated with the driving of the first and second conveyors, a card testing mechanism disposed between the first and second card conveyors for testing each card as it passes from one of the latter conveyors to the other, a magazine carried by the supporting frame and adapted to contain a plurality of reference cards each of said cards corresponding to one of the first-named cards, a gate disposed beneath the magazine for releasing certain of the reference cards therefrom in accordance with the operation of the card testing mechanism, means for bringing the reference cards and the releasing gate into reference card releasing relationship, and means for maintaining the bringing of the reference cards and the releasing gate into such relationships in synchronization with the movements of the index cards.

8. A card selecting mechanism including, a supporting frame, a first conveyor at one end of the frame having a pair of endless conveyor chains, each chain carrying a plurality of card receiving elements, a plurality of cards carried by the chains, each card having its opposite edges engaged by the card receiving elements of the pair of chains, means for driving the chains together so as to move the cards from one end of the conveyor to the other, a second conveyor at the opposite end of the frame having the recited elements of the first conveyor, means for driving the second conveyor simultaneously with and in a direction opposite to the driving of the first conveyor, guide means extending between the ends of the first and second conveyors, a third conveyor having an endless conveyor chain extending substantially parallel to the guide means for moving the cards via the guide means from the first conveyor to the second and return, a card testing mechanism disposed adjacent one of the guide means for testing each card as it passes from the first conveyor to the second and adapted to contain a magazine carried by the supporting frame, a plurality of reference cards each of said cards corresponding to one of the first-named cards, a gate disposed beneath the magazine for releasing certain of the reference cards therefrom in accordance with the operation of the card testing mechanism, means for bringing the reference cards and the releasing gate into reference card releasing relationship, and means for maintaining the bringing of the reference cards and the releasing gate into such relationships in synchronization with the movements of the index cards.

9. A card selecting mechanism including, a supporting frame, a first vertical card conveyor at one end of the frame having a pair of endless conveyor chains, each chain carrying a plurality of card-supporting shelves, a plurality of cards supported upon the shelves, each card having its opposite edges resting upon opposite shelves of the two conveyor chains, means for the first conveyor upwardly so as to move the cards upwardly in the mechanism, a second vertical conveyor at the opposite end of the frame disposed substantially parallel to the first conveyor and having the recited elements of the first conveyor, means for driving the second conveyor downwardly so as to move the cards downwardly in the mechanism, a third conveyor having a pair of endless chains extending in a circuit adjacent the perimeter of the frame, the top and bottom portions of the circuit extending in substantially horizontal planes contiguous to the upper and lower ends of the first and second conveyors, a plurality of card-engaging fingers projecting inwardly from the last-named chains, substantially horizontal guide rails extending between the upper ends and between the lower ends of the first and second conveyors, a card testing mechanism disposed adjacent the guide rails at one end of the vertical conveyors for testing each card as it passes between the vertical conveyors, a magazine carried by the supporting frame and adapted to contain a plurality of reference cards each of said cards corresponding to one of the first-named cards, a gate disposed beneath the magazine for releasing certain of the reference cards therefrom in accordance with the operation of the card testing mechanism, means for bringing the reference cards and the releasing gate into reference card releasing relationship, and means for maintaining the bringing of the reference cards and the releasing gate into such relationships in synchronization with the movements of the index cards.

10. A card selecting mechanism including, a supporting frame, a card conveyor disposed at one end of the frame, a second card conveyor disposed at the opposite end of the frame, a plurality of cards carried by the two conveyors, a third conveyor extending between the ends of the first and second conveyors for conveying cards therebetween, a card-shifting structure between the first and second conveyors, a plurality of individually depressible keys into engagement with which the cards are shifted, an electrical contact carried by the card-shifting structure, a complementary electrical contact associated with the keys, driving means for reciprocating the card-shifting structure, an electrical circuit adapted to be closed by engagement of the two recited electrical contacts, a magazine carried by a supporting frame and adapted to contain a plurality of reference cards, each reference card corresponding to one of the first-named cards, a gate disposed beneath the magazine for releasing selected reference cards therefrom, a solenoid connected in the electrical circuit operating said gate upon the closure of the electrical circuit, and a receptacle for receiving the reference cards as they drop through the gate from the magazine, means for bringing the reference cards and the releasing gate into reference card releasing relationship, and means for maintaining the bringing of the reference cards and the releasing gate into such relationships in synchronization with the movements of the index cards.

11. A card selecting mechanism as set forth in claim 10 wherein the means for bringing the reference cards and the releasing gate into reference card releasing relationship and maintaining such action in synchronization with the movements of the index cards is means for revolving the magazine in accordance with the movement of the third conveyor.

12. A card selecting mechanism including, a supporting frame, a card conveyor disposed at one end of the frame, a second card conveyor disposed at the opposite end of the frame, a plurality of cards carried by the two conveyors, each card carrying a plurality of openings arranged over the card in correspondence to certain data represented by that card, a third conveyor extending between the ends of the first and second conveyors for conveying cards therebetween, a card-shifting structure between the first and second conveyors, a keyboard carried by the frame adjacent the card-shifting structure, the keyboard having a plurality of individually depressible keys into engagement with which the cards are shifted, an electrical contact carried by the card-shifting structure, a complementary electrical contact associated with the keys, driving means for reciprocating the card-shifting structure toward and away from the keyboard, an electrical circuit adapted to be closed by engagement of the two recited electrical contacts, and adapted to contain a magazine carried by a supporting frame and adapted to contain a plurality of reference cards, each reference card corresponding to one of the first-named cards, a gate disposed beneath the magazine for releasing selected reference cards therefrom, a solenoid connected in the electrical circuit operating said gate upon the closure of the electrical circuit, a receptacle for receiving the reference cards as they drop through the gate from the magazine, means for bringing the reference cards and the releasing gate into reference card releasing relationship, and means for maintaining the bringing of the reference cards and the releasing gate into such relationships in synchronization with the movements of the index cards.

13. A card-selecting mechanism including, a supporting frame, an upwardly moving card conveyor at one end of the frame, a downwardly moving card conveyor at the opposite end of the frame, a plurality of cards carried by the card conveyors, horizontal conveyors extending between the upper and lower ends of the card conveyors, a card-testing mechanism disposed between the card conveyors for testing each card as it passes from one card conveyor to the other, a card-shifting structure, means for reciprocating said structure toward and away from the card-testing mechanism, a card-receiving platform forming a portion of the card shifting structure and being adapted to receive one of the cards and move it into engagement with the card-testing mechanism, and a yieldable connection between the card-shifting structure and the platform permitting relative movement between the latter two elements.

14. A card selecting mechanism including, a supporting frame, a card conveyor disposed at one end of the frame, a second card conveyor disposed at the opposite end of the frame, a plurality of cards carried by the two conveyors, each card carrying a plurality of openings arranged over the card in correspondence to certain data represented by that card, a third conveyor extending between the ends of the first and second conveyors for conveying cards therebetween, a card-shifting structure between the first and second conveyors, a keyboard carried by the frame adjacent the card-shifting structure, the keyboard having a plurality of individually depressible keys into engagement with which the cards are shifted, a single electrical contact carried by the card-shifting structure, a complementary electrical contact associated with the keys, a card testing mechanism disposed between the card conveyors for testing each card as it passes from one card conveyor to the other, driving means for reciprocating the card-shifting structure toward and away from the keyboard, the card-shifting structure including a card carriage having an element projecting from one side thereof, a second element having a sump receiving the projecting element, the latter element being positively reciprocated by the structure driving means, and a body of fluid disposed between the sump and the projecting element.

15. A card selecting mechanism as set forth in claim 14 wherein the body of fluid is a body of fluid partially filling the space between the sump and the projecting element.

16. A card selecting mechanism including, a supporting frame, a card conveyor carried by the frame, a plurality of index cards carried by the conveyor, an index card testing mechanism carried by the supporting frame for testing each index card as it is carried by the conveyor, a magazine carried by the supporting frame and adapted to contain a plurality of reference cards each corresponding to one of the index cards, means controlled by the index card testing mechanism for releasing the reference cards from the magazine, and means for effecting relative movement between the magazine and the reference card releasing means in synchronization with the movement of the index cards through the card testing mechanism whereby the reference cards in the magazine are brought into position relative to the card releasing means for removal from the magazine in synchronization with the movements of the index cards through the card testing mechanism.

17. A card selecting mechanism including, a supporting frame, a card conveyor carried by the frame, a plurality of index cards carried by the conveyor, an index card testing mechanism carried by the supporting frame for testing each index card as it is carried by the conveyor, a movable magazine carried by the supporting frame and adapted to contain a plurality of reference cards each corresponding to one of the index cards, means for moving the magazine, means controlled by the index card testing mechanism for releasing the reference cards from the magazine, and means for maintaining the movement of the magazine in synchronization with the movements of the index cards through the card testing mechanism.

VINCENT E. FRIEDEWALD.

References Cited in the file of this patent

UNITED STATES PATENTS

| Number | Name | Date |
|---|---|---|
| 1,236,482 | Powers | Aug. 14, 1917 |
| 1,376,556 | Lasker | May 3, 1921 |
| 2,257,220 | Becker | Sept. 30, 1941 |
| 2,288,770 | Armbruster | July 7, 1942 |
| 2,310,445 | Lang | Feb. 9, 1943 |

FOREIGN PATENTS

| Number | Country | Date |
|---|---|---|
| 844,008 | France | Apr. 11, 1939 |